(No Model.) 2 Sheets—Sheet 2.
G. T. WARWICK.
BICYCLE.
No. 322,221. Patented July 14, 1885.
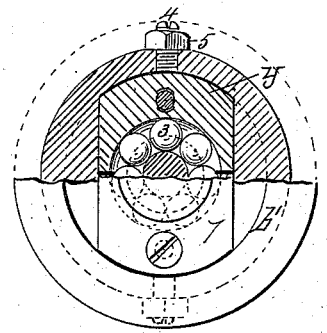
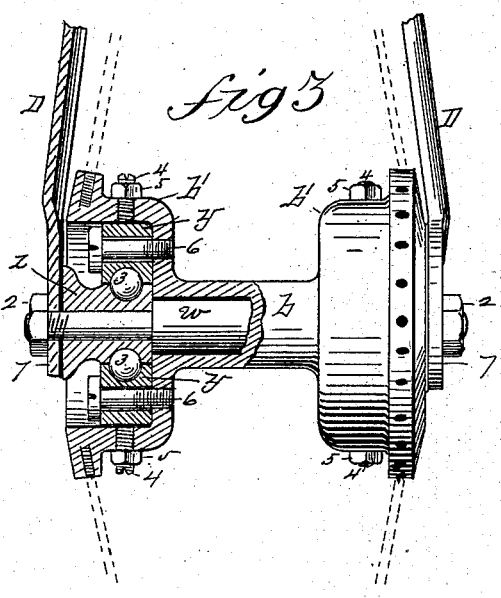
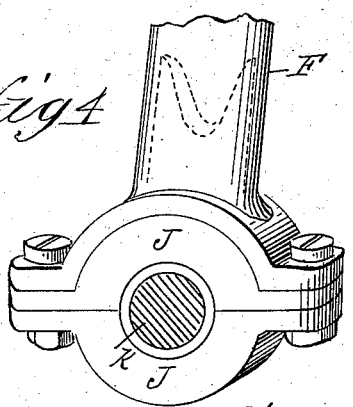
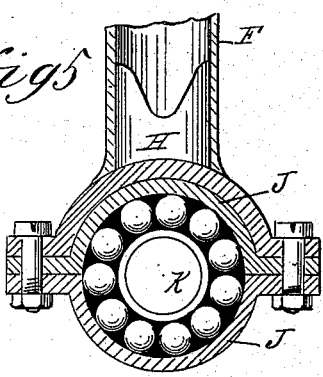
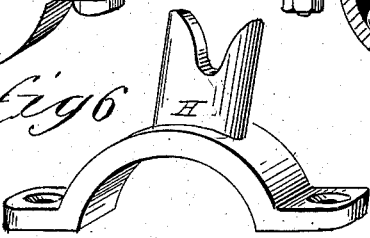
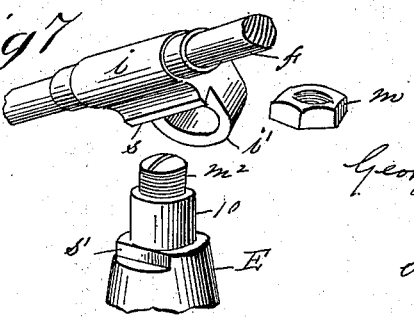
WITNESSES:
J. D. Garfield
G. B. Ryden
INVENTOR
George T. Warwick
BY
Henry A. Chapin
ATTORNEY

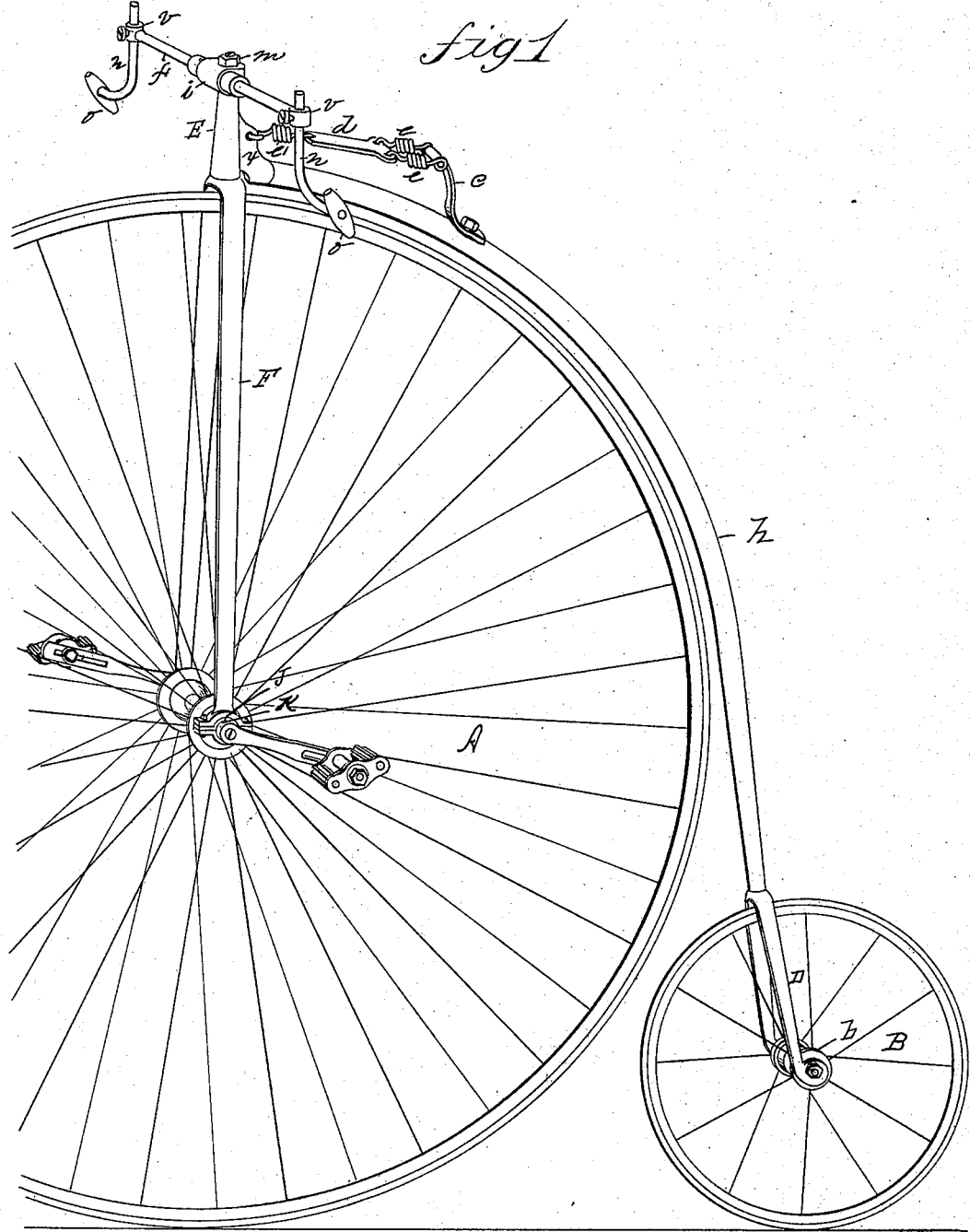

UNITED STATES PATENT OFFICE.

GEORGE T. WARWICK, OF SPRINGFIELD, MASSACHUSETTS.

BICYCLE.

SPECIFICATION forming part of Letters Patent No. 322,221, dated July 14, 1885.

Application filed November 12, 1884. (No model.)

*To all whom it may concern:*

Be it known that I, GEORGE T. WARWICK, a citizen of England, residing at Springfield, in the county of Hampden and State of Massachusetts, have invented new and useful Improvements in Bicycles, of which the following is a specification.

This invention relates to improvements in bicycles, the object being to provide improved ball-bearings therefor and improved means for attaching such bearings to the main-wheel fork of the machine; improved handle-bars whereby the rider can adjust the position of his hands at a point below the horizontal bar; improved means for connecting the handle-bar with the main-fork post, and an improved saddle-support adapted to be used on bicycles or tricycles.

In the drawings, forming part of this specification, Figure 1 is a perspective view of a bicycle embodying my improvements. Fig. 3 is a side elevation, partly in section, of the rear wheel-hub and axle of the same. Fig. 2 is an end view, partly in section, of the hub shown in Fig. 3. Fig. 4 is a side view, and Fig. 5 a like view, partly in section, of the bearing of the large-wheel axle in the main fork. Fig. 6 is a view of the bearing part to which the lower end of the main fork is attached. Fig. 7 shows detail parts of the handle-bar connections with the fork-post and the upper end of the latter.

In the drawings, A is the main, and B the small wheel, of the bicycle. $h$ is the backbone. D is the small-wheel fork, and F is the large fork. K is the main-wheel axle. J is the ball-bearing box of the latter. E is the fork-post. $w$ is the axle of the small wheel, and $b$ is the hub of the latter.

My improved ball-bearings are shown in detail in Figs. 2 and 3, which illustrate said bearings in connection with the hub $b$ and axle $w$. The said axle is turned down at its ends to allow of placing thereon the grooved journal $z$, and against the outer face of the latter is secured the fork-plate 7 by the nut 2, and thereby said journal is rigidly secured on the axle between said plate and a shoulder on the axle. The hub $b$ has its central part fitted free on the axle to avoid friction, and is provided at each end with a chamber, as shown, to the flange of which are secured the wheel-spokes in the ordinary way. Said chamber on the hub is adapted to receive within it two ball-bearing casings, $y\ y$, which are adapted to close upon the journal $z$ from opposite sides, and which are grooved to coincide with the groove on the journal. Said blocks $y$ are held against the rear side of the chamber by a screw, 6, through each, the latter being so fitted therein as to allow the casing to be adjusted or moved toward the journal to take up any wear of parts. The bolt 4 and its set-nut 5 provide means for said adjustment. The casings $y$ and journal $z$ are suitably hardened, and a series of hardened balls, 3, is placed in the groove between said parts. When the wheel-hub revolves, the axle $w$ and journal $z$ rest stationary, the hub and casings $y$ revolving around them upon said balls.

Any suitable plate, to keep out dust, may be fixed in the outer end of the chamber on the hub between the plate 7 and the casings.

The ball-bearings shown in Figs. 4 and 5 are of an ordinary type; but in said figures are shown improved means for securing such bearings to the fork F of a bicycle, as follows, viz: H illustrates the ordinary forged bearing-piece, which is brazed or otherwise suitably secured to the end of the vertical tubular part of the fork; but I provide, to be attached to the piece H in the manner shown, the ball-casings J, of hardened metal, which are interiorly grooved to adapt them to receive therein a series of balls, as shown, which roll between the said casings and a suitable journal on the axle K. The manner in which the part H and the end of the fork are usually united or secured one to the other precludes hardening the piece H, and hence the necessity of having the separate hardened casing J, which is secured within the circular portion of piece H to constitute a proper bearing for said balls.

Great inconvenience has arisen heretofore by reason of the rigid connection of the handle-bar $f$ with the post E of the fork D, as thereby close packing for transportation has not been possible. I therefore construct the post and handle-bar connection as follows: In Fig. 7 is shown the upper end of the post E, having a reduced portion, 10, through the top of which passes a screw, $m^2$, which holds the upper end of the stem $x$ of the backbone in the usual way. The post E has an offset, $s'$, on one side. The handle-bar sleeve $i$, in which the handle-bar $f$ is rigidly fixed, has a collar, $i'$, on one side, which fits onto the part 10 on the post E, the lip $s$ fitting into the offset $s'$, and the nut $m$ being placed on screw $m^2$, the handle-bar and its sleeve are rigidly fixed on the post and cannot turn thereon, and yet are easily removed for packing the machine for transportation.

It is often desirable that the rider of a bicycle may have means for grasping the handle-bar at a point below the line of bar $f$, and at a distance more or less beyond the ends of the latter; and to meet this want I provide the bar $f$ with a collar, $v$, at each end, each provided with a set-screw, as shown, and in each of said collars is fitted an auxiliary handle-bar, $n$, extending downward and outward, having the handle $o$ thereon. The bars $n$ may, by aid of the aforesaid set-screw, be adjustable up or down, and the handles be turned to accommodate the wishes of the rider.

The improved spring saddle-support consists of a spring-bar, $c$, secured to the backbone $h$, having a cross-bar at its upper end, and of a bar, $d$, having one end secured by two short coil-springs to the bar $c$ and its opposite end connected to the stem $x$ of the backbone by the coil-spring $e'$. The seat or saddle is secured in any convenient manner to the bar $d$, and said parts together constitute an agreeable spring-seat for the rider.

What I claim as my invention is—

1. The combination, with the backbone of a bicycle having fork D, of the ball-bearings, consisting of the axle $w$, having grooved journals thereon rigidly secured between the branches of fork D and a suitable shoulder on the axle, the hub $b$, having secured thereto the grooved casings $y$ opposite the journal, and the series of balls 3, combined and operating substantially as set forth.

2. In combination with the frame of a bicycle having a fork, D, the improved ball-bearings, consisting of the following elements, viz: an axle having a grooved journal thereon, a hub having a chambered end extending over said journal, grooved casings adjustably secured in the end of the hub opposite the journal, and a series of balls interposed between said casings and journal, combined and operating substantially as set forth.

3. The combination, with the main fork F, of the separate forged bearing-piece H, the ball-casings J J, removably attached thereto, the balls bearing against said casing, and the inclosed axle, all relatively arranged substantially as stated.

4. The movable handle-bar connection with post E, consisting of a sleeve to receive the said bar, having a collar thereon to fit the fork-post and a lip thereon one side of said collar, and the fork-post having its upper end adapted to receive said collar, and an offset thereon to receive said lip, and suitable means for securing the sleeve and collar to the post, combined and operating substantially as set forth.

5. In a bicycle, the within-described improved saddle-support, consisting of a spring-bar secured to the backbone of the machine and of a bar, $d$, adapted to have the saddle secured thereto suspended between said spring-bar and the stem of the backbone by spiral springs connecting the ends of the bar with the spring-bar and said stem, combined and operating substantially as set forth.

6. In combination, the backbone $h$, the stem $x$, spring-bar $c$, bar $d$, and the springs $e$ and $e'$, substantially as set forth.

7. As a spring saddle-support for bicycles and tricycles, the spring-bar $c$ and spring $e'$, suitably secured to the machine, the bar $d$, and the springs $e$ $e$, combined and operating substantially as described.

GEO. THO. WARWICK.

Witnesses:
H. A. CHAPIN,
J. D. GARFIELD.